US007874242B2

(12) United States Patent
Orihara et al.

(10) Patent No.: US 7,874,242 B2
(45) Date of Patent: Jan. 25, 2011

(54) PISTON ASSEMBLY IN FLUID PRESSURE CYLINDER

(75) Inventors: Syun Orihara, Tsukubamirai (JP); Naoki Hoshi, Tsukubamirai (JP); Shinichiro Nemoto, Tsukubamirai (JP); Hiroyuki Asahara, Tsukubamirai (JP)

(73) Assignee: SMC Corporation, Chiyoda-ku, Tokyo (JP)

( * ) Notice: Subject to any disclaimer, the term of this patent is extended or adjusted under 35 U.S.C. 154(b) by 422 days.

(21) Appl. No.: 12/075,660

(22) Filed: Mar. 13, 2008

(65) Prior Publication Data

US 2008/0236387 A1 Oct. 2, 2008

(30) Foreign Application Priority Data

Mar. 28, 2007 (JP) ............................ 2007-084029

(51) Int. Cl.
*F15B 15/20* (2006.01)
*F16J 10/00* (2006.01)

(52) U.S. Cl. ........................................................ 92/255

(58) Field of Classification Search .................. 92/255; 403/273, 332
See application file for complete search history.

(56) References Cited

U.S. PATENT DOCUMENTS 3,426,656 A * 2/1969 Bimba ......................... 92/255
3,426,657 A * 2/1969 Bimba ......................... 92/255
4,004,499 A * 1/1977 Beck ........................... 92/255
4,024,802 A * 5/1977 Koppa ......................... 92/255
6,817,278 B2 * 11/2004 Hennemann et al. .......... 92/255
6,892,625 B2 * 5/2005 Blackman et al. ............. 92/255

FOREIGN PATENT DOCUMENTS

JP S47-43773 A 12/1972
JP S58-123957 U 8/1983
JP 60-142304 U 9/1985
JP S60-142304 U 9/1985
JP H05-99211 A 4/1993

OTHER PUBLICATIONS

Japanese Notice of the reason for refusal dated Jan. 13, 2009.

* cited by examiner

*Primary Examiner*—Thomas E Lazo
(74) *Attorney, Agent, or Firm*—Yokoi & Co., U.S.A., Inc.; Toshiyuki Yokoi

(57) ABSTRACT

The piston 4 comprises a fixing ring 8 mounted on a piston rod 6, and a piston body 10 fixed to the fixing ring 8. The fixing ring 8 is comprised of two semi-circular plated members 8A, 8B having plural threaded holes 8*a* for bolt-fastening of the piston body 10. When they are abutted against each other and formed into a circular-annular shape, a hole portion 8*c* which is to be tightly fitted in a fixing groove 6*a* of the piston rod 6 is formed. The piston body 10 has a hole portion 10*a* which is to be fitted over the piston rod 6, and plural bolt holes 10*c* corresponding to the threaded holes 8*a*. Moreover, the piston body 10 has a concave portion 10*d* on a side of one surface thereof, in which the fixing ring 8 is fitted in an embedded state.

2 Claims, 3 Drawing Sheets

PISTON ASSEMBLY IN FLUID PRESSURE CYLINDER

CROSS-REFERENCES TO RELATED APPLICATIONS

The present application is related to the Japanese Patent Application No. 2007-084029, filed Mar. 28, 2007, the entire disclosure of which is expressly incorporated by reference herein.

BACKGROUND OF THE INVENTION (1) Field of the Invention

The present invention relates to a piston assembly which is assembled by mounting a piston with respect to a piston rod, the piston is to be slidably inserted in a cylinder member of a double rod fluid pressure cylinder.

(2) Description of Related Art

As a piston assembly in which a piston is mounted with respect to a piston rod in a double rod fluid pressure cylinder, there is conventionally known a piston assembly in which, as shown in FIG. 2 of Japanese Utility Model Application Laid-Open No. Sho. 60-142304, for example, a fixing ring C is mounted in a fixing groove provided at a piston fixing-position around an outer circumferential surface of a piston rod B, a piston A is assembled by causing two piston segment members a1, a2, which are divided in an axial direction of the piston rod B, to be opposingly combined with each other on the fixing ring C, and the piston A is fastened with respect to the piston rod B by a plurality of bolts D which are threadedly inserted in the piston A in the axial direction of the piston rod B.

However, the conventional piston assembly has the structure in which three members including the two-divided piston, namely, the two piston segment members a1, a2, and the fixing ring C are joined to one another in the axial direction of the piston rod B, so that a width measured in an axial direction of the piston A becomes large and, therefore, there is a problem that such a structure becomes a hindrance to attempt the thinnerization of a size measured in a stroke direction of a fluid pressure cylinder which undergoes, especially, a small stroke.

BRIEF SUMMARY OF THE INVENTION

The present invention discloses to provide a piston assembly in a double rod fluid pressure cylinder, in which a width that is measured in an axial direction of a piston is made as thinly as possible, thus making it possible to attain the thinnerization of the fluid pressure cylinder.

One aspect of the present invention provides a piston assembly in a fluid pressure cylinder, comprising: a piston rod; a piston mounted with respect to the piston rod and slidably inserted in a cylinder body of a double rod fluid pressure cylinder; the piston rod having a fixing groove formed around a circumference of a piston-fixing position thereof; the piston comprising: a circular-annular fixing ring mounted in the fixing groove of the piston rod; a piston body fixed to the fixing ring by a plurality of bolts and having a diameter larger than that of the fixing ring; the fixing ring comprising two semi-circular plated members; each of the semi-circular plated members having at least one threaded hole for bolt-fastening the piston body to the fixing ring; the semi-circular plated members are configured such that they are abutted against each other to thereby form the circular plated fixing ring having a first hole portion at a center thereof; the first hole portion of the fixing ring is tightly fitted in the fixing groove of the piston rod; the piston body having a second hole portion at a center thereof, which is fitted over the piston rod, a plurality of bolt holes corresponding to the threaded hole of the fixing ring, and a concave portion formed around the second hole portion on a side of one surface of the piston body; the fixing ring is fitted in an embedded state in the concave portion of the piston body; and the piston body is fixed to the fixing ring by the bolts which are threadedly inserted in the threaded hole and the bolt hole.

According to the piston assembly of the present invention in the double rod fluid pressure cylinder, the piston is comprised of the two members including the circular-annular fixing ring and the piston body, and in the condition where the fixing ring which is fitted in the fixing groove of the piston rod is mounted in the embedded state in the concave portion of the piston body, they are fastened to one another by the plurality of bolts, whereby the piston is mounted with respect to the piston rod, so that a width which is measured in an axial direction of the piston can be made as thinly as possible and, therefore, it is possible to attempt the thinnerization of the fluid pressure cylinder.

An optional aspect of the present invention provides the piston assembly in the fluid pressure cylinder, wherein the second hole portion of the piston body is fitted over the piston rod through a sealing member.

Another optional aspect of the present invention provides the piston assembly in the fluid pressure cylinder, wherein an outer circumferential surface of the fixing ring and/or an inner circumferential surface of the concave portion of the piston body is formed as a tapered surface which allows the outer circumferential surface of the fixing ring and the inner circumferential surface of the concave portion of piston body to be, as a whole or partially, pressedly contacted with each other when the fixing ring is fitted in the concave portion of the piston body, whereby the piston body is aligned with respect to the piston rod.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as a description of presently preferred embodiments of the invention and is not intended to represent the only forms in which the present invention may be constructed and/or utilized.

Figure 1:
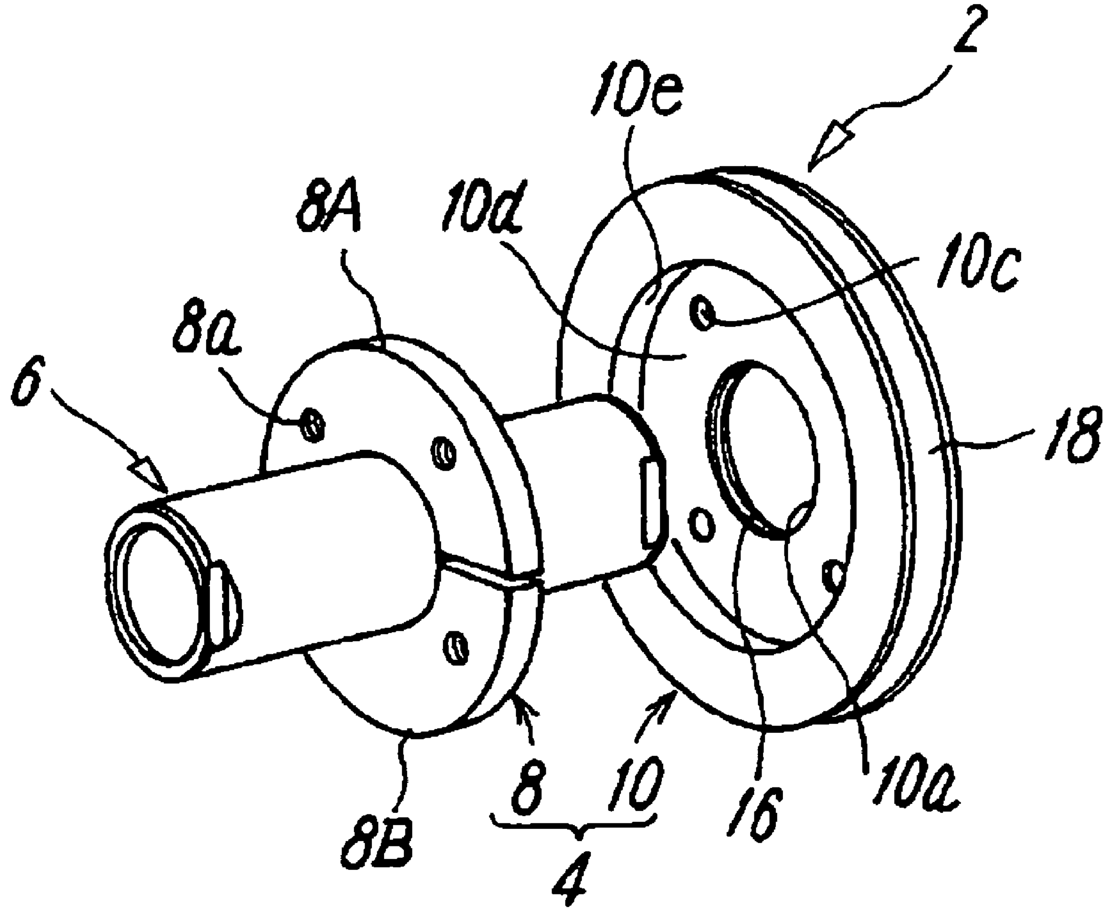
FIG. 1 is an exemplary exploded perspective view showing an entire structure of a piston assembly in a fluid pressure cylinder, according to an embodiment of the present invention.
Figure 2:
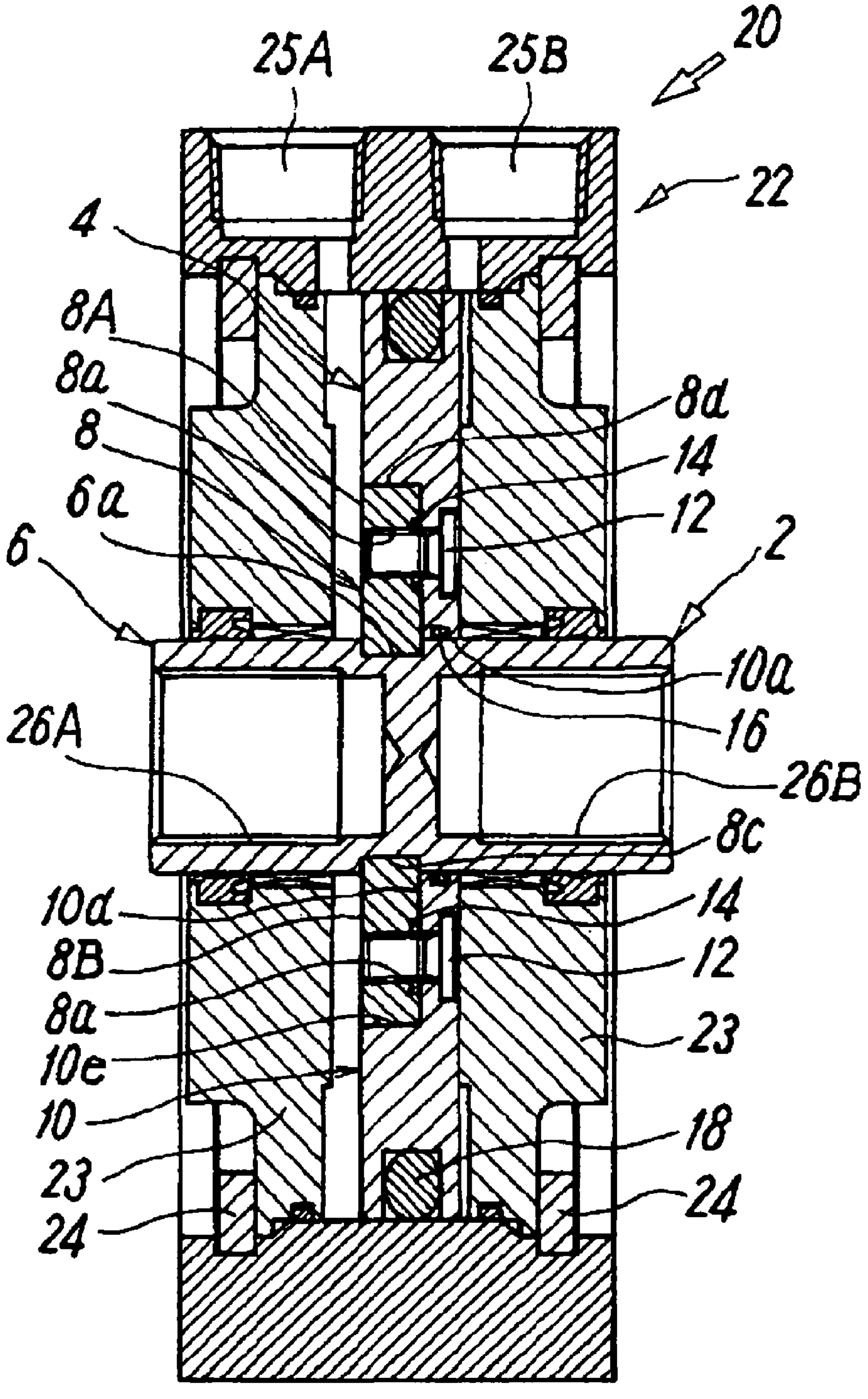
FIG. 2 is a sectional view of the fluid pressure cylinder utilizing the piston assembly of FIG. 1.
Figure 3:
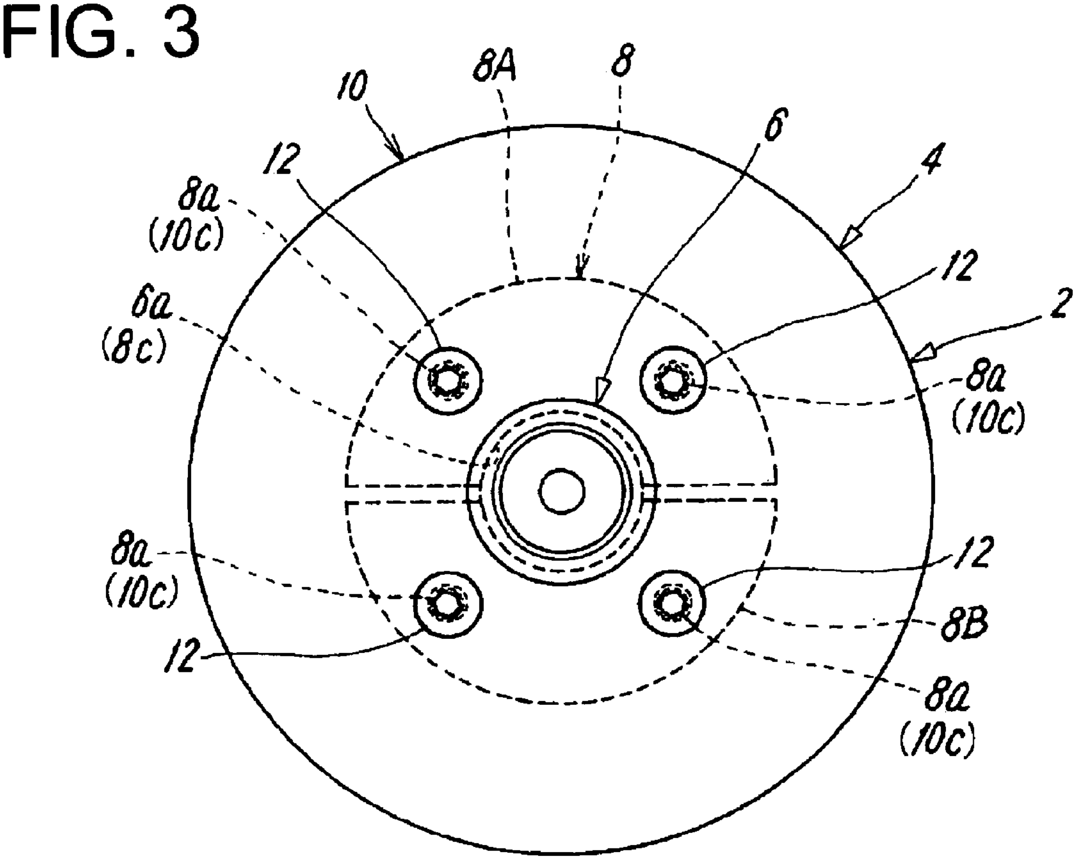
FIG. 3 is a front view of the piston assembly applied to the fluid pressure cylinder of FIG. 2.

Embodiments of a piston assembly in a fluid pressure cylinder, according to the present invention will be discussed in detail hereinafter with reference to the drawings. FIG. 1 is an exploded perspective view showing one example of a structure mode of a piston assembly 2 according to an embodiment of the present invention. FIG. 2 is a sectional view showing one example of a fluid pressure cylinder 20 to which the piston assembly 2 is applied. FIG. 3 is a front view showing a structure of the piston assembly 2 applied to the fluid pressure cylinder 20 of FIG. 2.

In a case where the piston assembly 2 according to the present invention is realized as a piston assembly which is assembled by mounting a piston 4 with respect to a cylinder rod 6, the piston 4 is to be slidably inserted in a cylinder body 22 in the fluid pressure cylinder 20 which is of a double rod and undergoes a small stroke, the piston assembly according to the present invention is particularly available in terms of attempting the thinnerization of the fluid pressure cylinder 20.

As shown in FIG. 1 to 3, the piston assembly 2 is schematically constructed as a piston assembly in which the piston 4 which comprises a circular-annular fixing ring 8 and a piston body 10 having a diameter larger than that of the fixing ring 8 is mounted with respect to the piston rod 6 by causing the fixing ring 8 to be tightly fitted in a fixing groove 6*a* circumferentially formed around a fixing-position of the piston on the piston rod 6, and causing the piston body 10 to be threadedly secured to the fixing ring 8 by a plurality of bolts 12.

More concretely, the fixing ring 8 which constitutes an element of the piston 4 comprises two semi-circular plated members 8A, 8B, each of which is formed, at predetermined positions of a circumferential direction of the semi-circular plated member, with at least one threaded hole 8*a* (two threaded holes per each semi-circular plated member are shown in the Figures) for fixing the piston body 10 by the bolts 12. Around those threaded holes 8*a*, circular-annular sealing members 14 for sealing between the fixing ring 8 and a concave portion 10*d* of the piston body 10 which will be discussed hereinafter are provided. The fixing ring 8 is constructed as a member, at a center of which a hole portion 8*c* which is to be tightly fitted in the fixing groove 6*a* of the piston rod 6 is provided, when the semi-circular plated members 8A, 8B are abutted against each other to thereby form the circular plated fixing ring 8.

On the other hand, the piston body 10 is formed in a center thereof with a hole portion 10*a* which is to be fitted over the piston rod 6 and around an inner circumferential surface of which a concave groove is formed. In the concave groove of the hole portion 10*a* of the piston body 10, a sealing member 16 for sealing between the piston body 10 and the piston rod 6 when the piston body 10 is fitted on the piston rod 6 is fitted and provided. Moreover, at predetermined positions of a circumferential direction of the piston body 10, a plurality of bolt holes 10*c* which correspond to the plurality of threaded holes 8*a* formed in the fixing ring 8 are formed. Around the hole portion 10*a* on a side of one surface of the piston body 10, a concave portion 10*d* in which the fixing ring 8 is to be fitted in an embedded state is formed. Incidentally, in the Figures, reference numeral 18 denotes a sealing member which is fitted in a concave groove formed in an outer circumferential surface of the piston body 10, and is to be tightly and rubbingly contacted with an inner circumferential surface of the cylinder body 22 in the fluid pressure cylinder 20.

Figure 4:
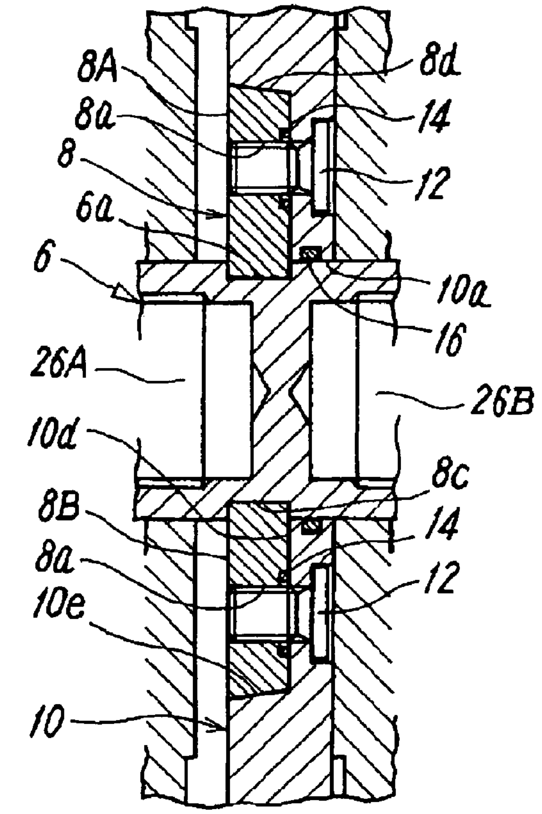
FIG. 4 is an exemplary sectional view showing an essential part of an example of a fitting-in structure for fitting a fixing ring with respect to a concave portion of a piston body.

Incidentally, the fixing ring 8 is fitted in the concave portion 10*d* of the piston body 10 in order that the piston 4 is made thin. In this case, it is desirable that, in order to cause the piston body 10 to be aligned with respect to the piston rod 6 and fixed to the piston rod 6, an outer circumferential surface 8*d* of the fixing ring 8 and an inner circumferential surface 10*c* of the concave portion 10*d* of the piston body 10 are designed such that they are, as a whole or at least partially, pressedly contacted with each other, and the aligning of the piston body 10 is performed on the basis of the fixing ring 8. In an example shown in FIG. 4, the outer circumferential surface 8*d* of the fixing ring 8 and the inner circumferential surface 10*e* of the concave portion 10*d* of the piston body 10 are formed as tapered surfaces which allows the entire circumferential surfaces 8*d*, 10*e* to be pressedly contacted with each other. The tapered surfaces on these circumferential surfaces 8*d*, 10*e* are formed so as to be diametrally reduced in such a direction that the fixing ring 8 is fitted in the concave portion 10*d* of the piston body 10.

Incidentally, when the piston body 10 is aligned with respect to the piston rod 6 and then fixed to the piston rod 6, the outer circumferential surface 8*d* of the fixing ring 8 and the inner circumferential surface 10*e* of the concave portion 10*d* of the piston body 10 should be, at least partially, pressedly contacted with each other. Therefore, it is not necessarily to form the both of the outer circumferential surface 8*d* of the fixing ring 8 and the inner circumferential surface 10*e* of the concave portion 10*d* of the piston body 10 as the tapered surfaces and only one of the circumferential surfaces 8*d*, 10*e* may be formed as a tapered surface. In this case, the other of the circumferential surfaces may be formed so as to be partially pressedly-contacted with the tapered surface.

In the Figures, a space between the semi-circular plated members 8A, 8B which are mounted, in the abutted state, with respect to the piston rod 6 and constitute the fixing ring 8 of the piston 4 is provided. The reason is that, in order to cause the piston body 10 to be aligned with respect to the piston rod 6, it is required that, when the semi-circular plated members 8A, 8B are abutted against each other to thereby form the circular plated fixing ring 8, the hole portion 8*c* of the fixing ring 8 is tightly fitted in the fixing groove 6*a* of the piston rod 6 without allowing a space to be produced between the hole portion 8*c* and the fixing groove 6*a*, and the fixing ring 8 is stably mounted on the piston rod 6 in such a manner that the fixing ring 8 and the piston rod 6 are not allowed to be rattled relative to each other. It goes without saying that if the hole portion 8*c* of the fixing ring 8 is tightly fitted in the fixing groove 6*a* of the piston rod 6 without allowing any space to be produced between the hole portion 8*c* and the fixing groove 8*a*, the semi-circular plated members 8A, 8B may be designed such that no space is provided between the semi-circular plated members 8A, 8B which are to constitute the fixing ring 8.

When the piston 4 is to be mounted with respect to the piston rod 6, to thereby form the piston assembly 2, first of all, as shown in FIG. 1, the semi-circular plated members 8A, 8B constituting the fixing ring 8 are abutted against each other on the piston rod 6, and the hole portion 8*c* of the fixing ring 8 is tightly fitted in the fixing groove 6*a* of the piston rod 6, whereby the fixing ring 8 is mounted with respect to the piston rod 6. Therefore, the fixing ring 8 is stably mounted with respect to the piston rod 6 in such a manner that the fixing ring 8 and the piston rod 6 are not allowed to be rattled relative to each other.

Next, the hole portion 10*a* of the piston body 10 is fitted over the piston rod 6 through the sealing member 16 provided around the inner circumferential surface of the hole portion 10*a*, and the fixing ring 8 is then fitted in the embedded state in the concave portion 10*d* of the piston body 10. At this time, it is possible to cause the piston body 10 to be easily and positively aligned with the piston rod 6, with resort to the considerably simple structure or the like in which the outer circumferential surface 8*d* of the fixing ring 8 and the inner circumferential surface 10*e* of the concave portion 10*d* of the piston body 10 are formed as the tapered surfaces which allow the entire circumferential surfaces 8*d*, 10*e* to be pressedly contacted with each other.

The bolts 12 are then threadedly inserted into the threaded holes 8*a* of the fixing ring 8 and the bolt holes 10*c* of the piston body 10, and the fixing ring 8 and the piston body 10 are bolt-secured to each other, whereby the piston assembly 2 in which the piston 4 is mounted with respect to the piston rod 6 is assembled. The sealing members 14 are provided around the threaded holes 8*a* of the fixing ring 8, so that, at this time, it is possible to positively ensure sealing performances around the threaded holes 8*a* and the bolt holes 10*c*.

Incidentally, in FIG. 2, reference numeral 23 denotes end plates on both sides of the cylinder body 22, reference numeral 24 designates a fixing ring for fixing the end plates 23 to the cylinder body 22, reference numerals 25A, 25B designate compressed air intake and exhaust ports provided in the cylinder body 22, and reference numerals 26A, 26B denote threaded holes for fixing a driven member which is to be provided at the piston rod 6.

In the piston assembly 2 in the fluid pressure cylinder 20, which has the above-mentioned structure, the piston 4 which is to be slidably inserted the cylinder body 20 in the fluid pressure cylinder 20 which is of the double rod and undergoes the small stroke is comprised of the two members which includes the circular-annular fixing ring 8 and the piston body 10, and the piston 4 is mounted with respect to the piston rod 6 by causing the fixing ring 8 and the piston body 10 to be secured to each other by the plurality of bolts 12 in the state where the fixing ring 8 mounted in the fixing groove 6*a* of the piston rod 6 is embedded in the concave portion 10*d* of the piston body 10, so that a size which is measured in a stroke direction of the fluid pressure cylinder 20 can be made as thinly as possible and, therefore, it is possible to attempt the thinnerization of the fluid pressure cylinder 20.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A piston assembly in a fluid pressure cylinder, comprising:

a piston rod;

a piston mounted with respect to the piston rod and slidably inserted in a cylinder body of a double rod fluid pressure cylinder;

the piston rod having a fixing groove formed around a circumference of a piston-fixing position thereof;

the piston comprising:

a circular-annular fixing ring mounted in the fixing groove of the piston rod;

a piston body fixed to the fixing ring by a plurality of bolts and having a diameter larger than that of the fixing ring;

the fixing ring comprising two semi-circular plated members;

each of the semi-circular plated members having at least one threaded hole for bolt-fastening the piston body to the fixing ring;

the semi-circular plated members are configured such that they are abutted against each other to thereby form the circular plated fixing ring having a first hole portion at a center thereof;

the first hole portion of the fixing ring is tightly fitted in the fixing groove of the piston rod;

the piston body having a second hole portion at a center thereof, which is fitted over the piston rod, a plurality of bolt holes corresponding to a threaded hole of the fixing ring, and a concave portion formed around the second hole portion on a side of one surface of the piston body;

the fixing ring is fitted in an embedded state in a concave portion of the piston body; and the piston body is fixed to the fixing ring by the bolts which are threadedly inserted in the threaded hole and the bolt hole, wherein an outer circumferential surface of the fixing ring and/or an inner circumferential surface of the concave portion of the piston body is formed as a tapered surface which allows the outer circumferential surface of the fixing ring and the inner circumferential surface of the concave portion of piston body to be, as a whole or partially, pressedly contacted with each other when the fixing ring is fitted in the concave portion of the piston body, whereby the piston body is aligned with respect to the piston rod.

2. A piston assembly in a fluid pressure cylinder, comprising:

a piston rod;

a piston mounted with respect to the piston rod and slidably inserted in a cylinder body of a double rod fluid pressure cylinder;

the piston rod having a fixing groove formed around a circumference of a piston-fixing position thereof;

the piston comprising:

a circular-annular fixing ring mounted in the fixing groove of the piston rod;

a piston body fixed to the fixing ring by a plurality of bolts and having a diameter larger than that of the fixing ring;

the fixing ring comprising two semi-circular plated members;

each of the semi-circular plated members having at least one threaded hole for bolt-fastening the piston body to the fixing ring;

the semi-circular plated members are configured such that they are abutted against each other to thereby form the circular plated fixing ring having a first hole portion at a center thereof;

the first hole portion of the fixing ring is tightly fitted in the fixing groove of the piston rod;

the piston body having a second hole portion at a center thereof, which is fitted over the piston rod, a plurality of bolt holes corresponding to a threaded hole of the fixing ring, and a concave portion formed around the second hole portion on a side of one surface of the piston body;

the fixing ring is fitted in an embedded state in a concave portion of the piston body; and the piston body is fixed to the fixing ring by the bolts which are threadedly inserted in the threaded hole and the bolt hole, wherein the second hole portion of the piston body is fitted over the piston rod through a sealing member, and an outer circumferential surface of the fixing ring and/or an inner circumferential surface of the concave portion of the piston body is formed as a tapered surface which allows the outer circumferential surface of the fixing ring and the inner circumferential surface of the concave portion of piston body to be, as a whole or partially, pressedly contacted with each other when the fixing ring is fitted in the concave portion of the piston body, whereby the piston body is aligned with respect to the piston rod.

* * * * *